(12) United States Patent
Watanabe

(10) Patent No.: US 9,344,003 B2
(45) Date of Patent: May 17, 2016

(54) INVERTER AND POWER CONVERSION DEVICE INCLUDING THE SAME

(75) Inventor: Keisuke Watanabe, Mizuho (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 821 days.

(21) Appl. No.: 13/536,324

(22) Filed: Jun. 28, 2012

(65) Prior Publication Data

US 2013/0002021 A1    Jan. 3, 2013

(30) Foreign Application Priority Data

Jun. 30, 2011    (JP) ................................. 2011-146731

(51) Int. Cl.
     *H02M 7/537*      (2006.01)
     *H02M 7/483*      (2007.01)

(52) U.S. Cl.
     CPC .............. *H02M 7/483* (2013.01); *Y10T 307/50* (2015.04)

(58) Field of Classification Search
     CPC ....................................................... H02M 7/483
     USPC ................................................... 307/151, 43
     See application file for complete search history.

(56) References Cited

U.S. PATENT DOCUMENTS

| | | | | |
|---|---|---|---|---|
| 4,052,657 A * | 10/1977 | Kleiner | ................... | H02M 7/49 363/43 |
| 4,947,310 A * | 8/1990 | Kawabata et al. | .............. | 363/71 |
| 6,005,788 A * | 12/1999 | Lipo | ........................ | H02M 7/49 363/71 |
| 7,688,048 B2 * | 3/2010 | Nielsen | .................... | H02J 1/102 307/151 |
| 7,830,687 B2 * | 11/2010 | Du | .......................... | H02M 7/49 307/45 |
| 7,839,023 B2 * | 11/2010 | Jacobson | ................ | H02M 1/42 307/77 |
| 8,559,202 B2 * | 10/2013 | Iwata et al. | ..................... | 363/71 |
| 8,625,315 B2 * | 1/2014 | Erdman | ............ | H02M 7/53875 363/41 |
| 2008/0258662 A1* | 10/2008 | Sato | ........................ | H02J 1/102 318/438 |
| 2009/0179623 A1* | 7/2009 | Mimatsu | ............. | B60L 11/1881 323/282 |
| 2009/0295229 A1* | 12/2009 | Harke | ............... | 307/75 |
| 2012/0153727 A1 | 6/2012 | Takano et al. | | |

FOREIGN PATENT DOCUMENTS

| | | |
|---|---|---|
| JP | 2006-238630 A | 9/2006 |
| JP | 2011-061887 | 3/2011 |
| WO | 2011025029 A1 | 3/2011 |

\* cited by examiner

*Primary Examiner* — Jared Fureman
*Assistant Examiner* — Emmanuel R Dominique
(74) *Attorney, Agent, or Firm* — McDermott Will & Emery LLP

(57) ABSTRACT

A control section generates a quasi-sine wave with a plurality of gradation voltages including power supply voltages from DC power supplies with different voltages and one or more potential differences between two of the power supply voltages. Specifically, the control section generates the quasi-sine wave by, in a time range where a sine wave voltage is at two gradation voltages, generating a PWM signal with one gradation voltage set at a low level and the other gradation voltage set at a high level. The timing for switching the PWM signal is determined using an intersection between a sine wave and a triangular wave in the time range where the sine wave voltage is at two gradation voltages, where the triangular wave is generated with one gradation voltage set at a low level and the other gradation voltage set at a high level.

2 Claims, 12 Drawing Sheets

FIG.4

| GRADATION LEVEL | S11 | S12 | S3 | S4 | S21 | S22 | S31 | S32 |
|---|---|---|---|---|---|---|---|---|
| 0 | OFF | OFF | ON | ON | OFF | OFF | OFF | OFF |
| 1 | OFF | OFF | OFF | OFF | ON | OFF | OFF | ON |
| 2 | ON | OFF | OFF | OFF | OFF | ON | OFF | OFF |
| 3 | ON | OFF | OFF | OFF | OFF | OFF | OFF | ON |
| 4 | OFF | OFF | OFF | ON | OFF | OFF | ON | OFF |
| 5 | OFF | OFF | OFF | ON | ON | OFF | OFF | OFF |
| 6 | ON | OFF | OFF | ON | OFF | OFF | OFF | OFF |
| −1 | OFF | OFF | OFF | OFF | OFF | ON | ON | OFF |
| −2 | OFF | ON | OFF | OFF | ON | OFF | OFF | OFF |
| −3 | OFF | ON | OFF | OFF | OFF | OFF | ON | OFF |
| −4 | OFF | OFF | ON | OFF | OFF | OFF | OFF | ON |
| −5 | OFF | OFF | ON | OFF | OFF | ON | OFF | OFF |
| −6 | OFF | ON | ON | OFF | OFF | OFF | OFF | OFF |

FIG.6

| GRADATION LEVEL | SW0 | SW1 | SW2 | SW3 | SW4 | SW5 | SW6 | SW7 | SW8 | SW9 | SW10 | SW11 | APPLIED VOLTAGE |
|---|---|---|---|---|---|---|---|---|---|---|---|---|---|
| 0 | OFF | ON | OFF | ON | OFF | OFF | OFF | OFF | OFF | OFF | OFF | OFF | 0V |
| 1 | ON | OFF | OFF | OFF | OFF | OFF | ON | OFF | OFF | OFF | OFF | OFF | 14V (=E1−E2) |
| 2 | OFF | OFF | OFF | ON | OFF | OFF | OFF | OFF | OFF | ON | OFF | OFF | 32V (=E3) |
| 3 | OFF | OFF | OFF | OFF | OFF | ON | OFF | OFF | OFF | OFF | ON | OFF | 50V (=E2−E3) |
| 4 | ON | OFF | OFF | OFF | OFF | OFF | OFF | OFF | OFF | OFF | ON | OFF | 64V (=E1−E3) |
| 5 | OFF | OFF | OFF | ON | OFF | OFF | OFF | OFF | OFF | OFF | OFF | OFF | 82V (=E2) |
| 6 | ON | OFF | OFF | ON | OFF | OFF | OFF | OFF | OFF | OFF | OFF | OFF | 96V (=E1) |

INVERTER AND POWER CONVERSION DEVICE INCLUDING THE SAME

BACKGROUND OF THE INVENTION

1. Field of the Invention

The present invention relates to an inverter for converting DC power into AC power, and a power conversion device including the inverter.

2. Description of the Related Art

In recent years, photovoltaic power generation systems have become more and more popular. A photovoltaic power generation system has a power conditioner installed for efficiently utilizing the power generated in a solar cell module. The power conditioner has an inverter mounted for converting DC power into AC power. For acquiring more power from the photovoltaic power generation system, it is important to improve the energy conversion efficiency of a solar battery cell and improve the power conversion efficiency of the power conditioner. Moreover, for connecting the power conditioner to the system, the inverter desirably contains harmonic waves and total harmonic distortion as little as possible.

A technique has conventionally been proposed in which PWM (Pulse Width Modulation) is utilized for removing the total harmonic distortion (refer to JP-A-2011-61887).
Patent Literature 1: JP-A-2011-61887

SUMMARY OF THE INVENTION

JP-A-2011-61887 has disclosed the technique for removing a harmonic wave component by turning on or off a switching means with a PWM signal but this technique cannot sufficiently remove the harmonic wave component because the timing for switching the PWM signal is not taken into consideration. The present invention has been made in view of such a circumstance and has an object to provide an inverter that outputs AC power with less total harmonic distortion.

According to an aspect of the present invention for solving the above problem, an inverter for converting DC power from a plurality of DC power supplies with different voltages into AC power includes a control section for generating a quasi-sine wave with a plurality of gradation voltages including at least the power supply voltages from the DC power supplies. The control section generates the quasi-sine wave by, in the time range where a sine wave voltage is at two gradation voltages, generating a PWM (pulse width modulation) signal with one gradation voltage set at a low level and the other gradation voltage set at a high level.

BRIEF DESCRIPTION OF THE DRAWINGS

FIG. 4 is a table expressing on/off states of switches for generating 13 kinds of gradation voltages;

FIG. 6 is a table expressing on/off states of switches for generating 7 kinds of gradation voltages with the inverter depicted in FIG. 5;

DETAILED DESCRIPTION OF THE INVENTION

The invention will now be described by reference to the preferred embodiments. This does not intend to limit the scope of the present invention, but to exemplify the invention.

Figure 1:
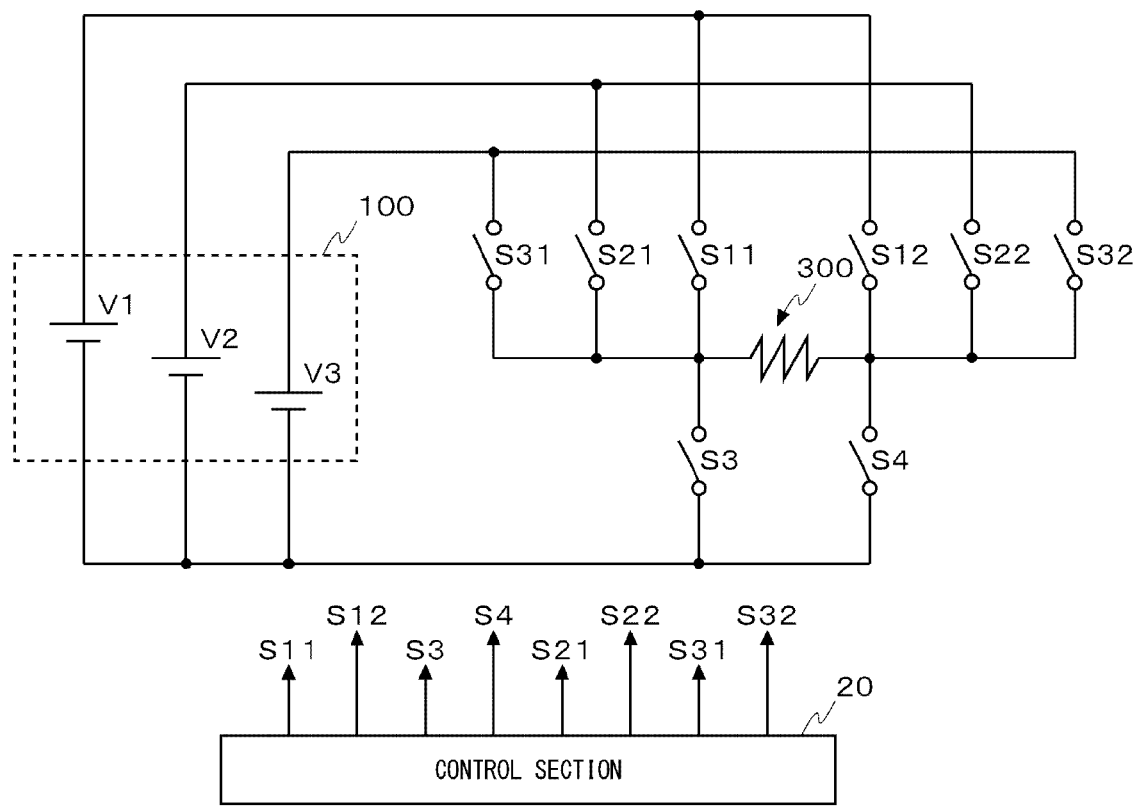
FIG. 1 is a circuit configuration diagram for an inverter according to an embodiment of the present invention.

FIG. 1 is a circuit configuration diagram for an inverter 200 according to an embodiment of the present invention. Although FIG. 1 depicts a DC power supply part 100 and a load 300 for the convenience of description, the DC power supply part 100 and the load 300 are not included as components of the inverter 200. The inverter 200 converts DC power from a plurality of DC power supplies included in the DC power supply part 100 into AC power. The DC power supply part 100 includes a first DC power supply V1, a second DC power supply V2, and a third DC power supply V3 with different power supply voltages. The inverter 200 includes a plurality of H-bridge circuits and a control section 20. The control section 20 generates a quasi-sine wave with the power supply voltage from each DC power supply and a differential voltage (hereinafter also called "potential difference") between the two power supply voltages.

Each of the H-bridge circuits is provided for each of the DC power supplies with different voltages, and supplies a forward voltage or a reverse voltage to the load 300 from each of the DC power supplies. The control section 20 generates the quasi-sine wave by controlling the H-bridge circuits.

In this embodiment, three kinds of DC power supplies (the first DC power supply V1, the second DC power supply V2, and the third DC power supply V3) are provided and the inverter 200 is provided with three H-bridge circuits. In this embodiment, the following relation is satisfied: the power supply voltage E1 of the first DC power supply V1>the power supply voltage E2 of the second DC power supply V2>the power supply voltage E3 of the third DC power supply V3. In another embodiment, two kinds of DC power supplies and two H-bridge circuits may be provided or four or more kinds of DC power supplies and four or more H-bridge circuits may be provided alternatively.

A first H-bridge circuit supplies a forward voltage or a reverse voltage to the load 300 from the first DC power supply V1, and includes a 1-1st switch S11, a 1-2nd switch S12, a first common switch S3, and a second common switch S4. The 1-1st switch S11 and the 1-2nd switch S12 are provided in parallel between the load 300 and a high-potential side of the first DC power supply V1. The first common switch S3 and the second common switch S4 are provided in parallel between the load 300 and a low-potential side of the first DC power supply V1.

More specifically, the 1-1st switch S11 is provided in a path that connects a high-potential-side terminal of the first DC power supply V1 and a high-potential-side terminal of the load 300, and the 1-2nd switch S12 is provided in a path that connects the high-potential-side terminal of the first DC power supply V1 and a low-potential-side terminal of the load 300. The first common switch S3 is provided in a path that connects a low-potential-side terminal of the first DC power supply V1 and the high-potential-side terminal of the load 300, and the second common switch S4 is provided in a path that connects the low-potential-side terminal of the first DC power supply V1 and the low-potential-side terminal of the load 300.

For applying the forward voltage from the first DC power supply V1 to the load 300, the control section 20 controls the first H-bridge circuit so that the 1-1st switch S11 and the second common switch S4 are on and the 1-2nd switch S12 and the first common switch S3 are off. On the other hand, for applying the reverse voltage from the first DC power supply V1 to the load 300, the 1-1st switch S11 and the second common switch S4 are off and the 1-2nd switch S12 and the first common switch S3 are on.

A second H-bridge circuit supplies a forward voltage or a reverse voltage from the second DC power supply V2 to the load 300, and includes a 2-1st switch S21, a 2-2nd switch S22, the first common switch S3, and the second common switch S4. The 2-1st switch S21 and the 2-2nd switch S22 are provided in parallel between the load 300 and a high-potential side of the second DC power supply V2. The first common switch S3 and the second common switch S4 are provided in parallel between the load 300 and a low-potential side of the second DC power supply V2.

A third H-bridge circuit supplies a forward voltage or a reverse voltage from the third DC power supply V3 to the load 300, and includes a 3-1st switch S31, a 3-2nd switch S32, the first common switch S3, and the second common switch S4. The 3-1st switch S31 and the 3-2nd switch S32 are provided in parallel between the load 300 and a high-potential side of the third DC power supply V3. The first common switch S3 and the second common switch S4 are provided in parallel between the load 300 and a low-potential side of the third DC power supply V3.

In this manner, in this embodiment, the first common switch S3 and the second common switch S4 of the first H-bridge circuit, the first common switch S3 and the second common switch S4 of the second H-bridge circuit, and the first common switch S3 and the second common switch S4 of the third H-bridge circuit are used in common. In other words, the two paths on the low-potential side that form the first H-bridge circuit, the two paths on the low-potential side that form the second H-bridge circuit, and the two paths on the low-potential side that form the third H-bridge circuit are used in common.

In this embodiment, a predetermined fixed voltage (for example, ground voltage) is used in common as each of the low-potential-side voltage of the first DC power supply V1, the low-potential-side voltage of the second DC power supply V2, and the low-potential-side voltage of the third DC power supply V3, so that their wires on the low-potential-side can be used in common. Thus, the number of switches included in the inverter 200 can be reduced.

The description on the specific connection relation and on/off operation of the 2-1st switch S21, the 2-2nd switch S22, the first common switch S3, and the second common switch S4 included in the second H-bridge circuit is omitted because they are similar to those of the 1-1st switch S11, the 1-2nd switch S12, the first common switch S3, and the second common switch S4 included in the first H-bridge circuit. Moreover, the description on the specific connection relation and on/off operation of the 3-1st switch S31, the 3-2nd switch S32, the first common switch S3, and the second common switch S4 included in the third H-bridge circuit is omitted because they are similar to those of the 1-1st switch S11, the 1-2nd switch S12, the first common switch S3, and the second common switch S4 included in the first H-bridge circuit.

For each of the 1-1st switch S11, the 1-2nd switch S12, the 2-1st switch S21, the 2-2nd switch S22, the 3-1st switch S31, the 3-2nd switch S32, the first common switch S3, and the second common switch S4, a power MOSFET (Meta-Oxide-Semiconductor Field-Effect Transistor), an IGBT (Insulated Gate Bipolar Transistor), a GaN transistor, a SiC-FET, or the like can be used.

In this embodiment, the control section 20 generates a quasi-sine wave by controlling the first H-bridge circuit, the second H-bridge circuit, and the third H-bridge circuit. More specifically, the control section 20 time-divisionally switches the voltage to be supplied to the load 300 by controlling the first H-bridge circuit, the second H-bridge circuit, and the third H-bridge circuit.

The inverter 200 including the three DC power supplies and the three H-bridge circuits can generate positive and negative gradation voltages (E1, E2, E3, −E3, −E2, and −E1), which are 6 kinds of voltages in total. With the zero voltage corresponding to the state of no voltage supply to the load 300, 7 kinds of gradation voltages can be generated. In this embodiment, another 6 kinds of gradation voltages are further generated without increasing the DC power supply and the H-bridge circuit. Therefore, 13 kinds of gradation voltages in total are generated.

A method of generating the other 6 kinds of gradation voltages is described below. The control section 20 activates the two paths on the high-potential side that form the first H-bridge circuit and the two paths on the high-potential side that form the second H-bridge circuit and deactivates the two paths on the low-potential side that form the first H-bridge circuit, the two paths on the low-potential side that form the second H-bridge circuit, and all the paths of the third H-bridge circuit; thus, the first and second H-bridge circuits are formed. That is to say, the first and second H-bridge circuits correspond to a circuit formed by combining a half of the first H-bridge circuit on the high-potential side and a half of the second H-bridge circuit on the high-potential side.

The first and second H-bridge circuits supply the potential difference between the first DC power supply V1 and the second DC power supply V2 to the load 300 in a forward direction or a reverse direction, and include the 1-1st switch S11, the 1-2nd switch S12, the 2-1st switch S21, and the 2-2nd switch S22.

For supplying the potential difference (E1−E2) between the first DC power supply V1 and the second DC power supply V2 to the load 300 in the forward direction, the control section 20 controls the first and second H-bridge circuits so that the 1-1st switch S11 and the 2-2nd switch S22 are on and the 1-2nd switch S12, the 2-1st switch S21, the first common switch S3, and the second common switch S4 are off. Meanwhile, for supplying the potential difference (E1−E2) between the first DC power supply V1 and the second DC power supply V2 to the load 300 in the reverse direction, the control section 20 controls the first and second H-bridge circuits so that the 1-2nd switch S12 and the 2-1st switch S21 are on and the 1-1st switch S11, the 2-2nd switch S22, the first common switch S3, and the second common switch S4 are off.

The control section 20 activates the two paths on the high-potential side that form the first H-bridge circuit and the two paths on the high-potential side that form the third H-bridge circuit and deactivates the two paths on the low-potential side that form the first H-bridge circuit, the two paths on the low-potential side that form the third H-bridge circuit, and all the paths of the second H-bridge circuit; thus, the first and third H-bridge circuits are formed. That is to say, the first and third H-bridge circuits correspond to a circuit formed by combining a half of the first H-bridge circuit on the high-potential side and a half of the third H-bridge circuit on the high-potential side.

The first and third H-bridge circuits supply the potential difference between the first DC power supply V1 and the third DC power supply V3 to the load 300 in the forward direction and the reverse direction, and include the 1-1st switch S11, the 1-2nd switch S12, the 3-1st switch S31, and the 3-2nd switch S32.

The control section 20 activates the two paths on the high-potential side that form the second H-bridge circuit and the two paths on the high-potential side that form the third H-bridge circuit and deactivates the two paths on the low-potential side that form the second H-bridge circuit, the two paths on the low-potential side that form the third H-bridge circuit, and all the paths of the first H-bridge circuit; thus, the second and third H-bridge circuits are formed. That is to say, the second and third H-bridge circuits correspond to a circuit formed by combining a half of the second H-bridge circuit on the high-potential side and a half of the third H-bridge circuit on the high-potential side.

The second and third H-bridge circuits supply the potential difference between the second DC power supply V2 and the third DC power supply V3 to the load 300 in the forward direction or the reverse direction, and include the 2-1st switch S21, the 2-2nd switch S22, the 3-1st switch S31, and the 3-2nd switch S32.

The description on the on/off operation of the 1-1st switch S11, the 1-2nd switch S12, the 3-1st switch S31, and the 3-2nd switch S32 included in the first and third H-bridge circuits and the on/off operation of the 2-1st switch S21, the 2-2nd switch S22, the 3-1st switch S31, and the 3-2nd switch S32 included in the second and third H-bridge circuits is omitted because the on/off operation thereof are similar to that of the 1-1st switch S11, the 1-2nd switch S12, the 2-1st switch S21, and the 2-2nd switch S22 included in the first and second H-bridge circuits, respectively.

Figure 2:
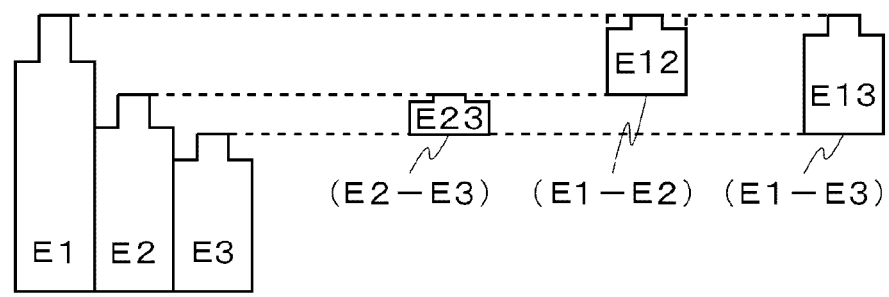
FIG. 2 is a diagram expressing the relation between the power supply voltage and the potential difference.

FIG. 2 is a diagram expressing the relation among the voltage E1 of the first DC power supply V1, the voltage E2 of the second DC power supply V2, the voltage E3 of the third DC power supply V3, a first potential difference (E1−E2) between the voltage E1 of the first DC power supply V1 and the voltage E2 of the second DC power supply V2, a second potential difference (E1−E3) between the voltage E1 of the first DC power supply V1 and the voltage E3 of the third DC power supply V3, and a third potential difference (E2−E3) between the voltage E2 of the second DC power supply V2 and the voltage E3 of the third DC power supply V3.

FIG. 2 depicts an example in which the ratio among the voltage E1 of the first DC power supply V1, the voltage E2 of the second DC power supply V2, and the voltage E3 of the third DC power supply V3 is set to 7:5:4. In this case, the ratio among the first potential difference (E1−E2), the second potential difference (E1−E3), and the third potential difference (E2−E3) is 2:3:1. As a whole, the ratio among the voltage E1 of the first DC power supply V1, the voltage E2 of the second DC power supply V2, the voltage E3 of the third DC power supply V3, the second potential difference (E1−E3), the first potential difference (E1−E2), and the third potential difference (E2−E3) is 7:5:4:3:2:1.

Figure 3:
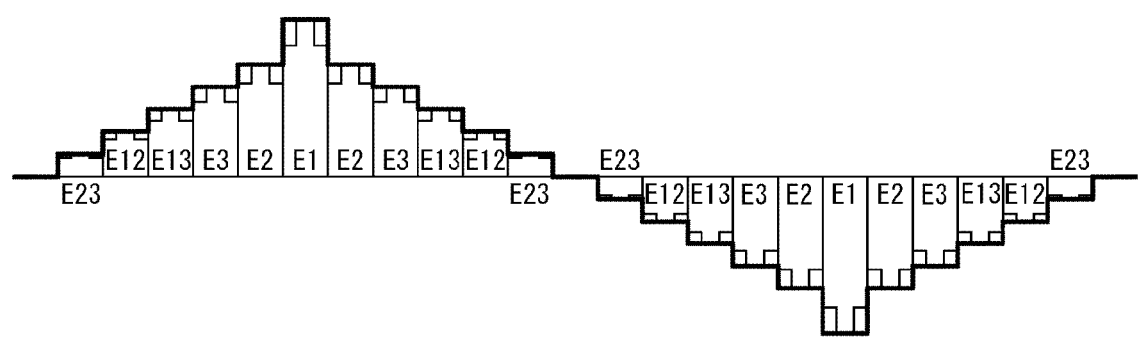
FIG. 3 is a diagram expressing the quasi-sine wave generated by gradation control.

FIG. 3 depicts the quasi-sine wave generated by gradation control only. As described above, 13 kinds of quasi-voltages can be generated in this embodiment. The control section 20 generates the quasi-sine wave by changing the voltage to be supplied to the load 300 in the order of zero voltage, the third potential difference (E2−E3) (positive), the first potential difference (E1−E2) (positive), the second potential difference (E1−E3) (positive), the voltage E3 of the third DC power supply V3 (positive), the voltage E2 of the second DC power supply V2 (positive), the voltage E1 of the first DC power supply V1 (positive), the voltage E2 of the second DC power supply V2 (positive), the voltage E3 of the third DC power supply V3 (positive), the second potential difference (E1−E3) (positive), the first potential difference (E1−E2) (positive), the third potential difference (E2−E3) (positive), zero voltage, the third potential difference (E2−E3) (negative), the first potential difference (E1−E2) (negative), the second potential difference (E1−E3) (negative), the voltage E3 of the third DC power supply V3 (negative), the voltage E2 of the second DC power supply V2 (negative), the voltage E1 of the first DC power supply V1 (negative), the voltage E2 of the second DC power supply V2 (negative), the voltage E3 of the third DC power supply V3 (negative), the second potential difference (E1−E3) (negative), the first potential difference (E1−E2) (negative), the third potential difference (E2−E3) (negative), and zero voltage. The quasi-sine wave can be generated by using the gradation voltages in this manner. The quasi-sine wave generated by only the gradation control includes the harmonic wave component as depicted by FIG. 3; in view of this, this embodiment has an object to generate a quasi-sine wave from which the harmonic wave component has been effectively removed by combining the gradation control and the PWM (pulse width modulation) control.

FIG. 4 is a table expressing the on/off states of the switches for generating the 13 kinds of gradation voltages. Gradation levels 0, 1, 2, 3, 4, 5, 6, −1, −2, −3, −4, −5, and −6 correspond to zero voltage, the third potential difference (E2−E3) (positive), the first potential difference (E1−E2) (positive), the second potential difference (E1−E3) (positive), the voltage E3 of the third DC power supply V3 (positive), the voltage E2 of the second DC power supply V2 (positive), the voltage E1 of the first DC power supply V1 (positive), the third potential difference (E2−E3) (negative), the first potential difference (E1−E2) (negative), the second potential difference (E1−E3) (negative), the voltage E3 of the third DC power supply V3 (negative), the voltage E2 of the second DC power supply V2 (negative), and the voltage E1 of the first DC power supply V1 (negative), respectively. The control section 20 performs the on/off control on the 1-1st switch S11, the 1-2nd switch S12, the first common switch S3, the second common switch S4, the 2-1st switch S21, the 2-2nd switch S22, the 3-1st switch S31, and the 3-2nd switch S32.

Figure 5:
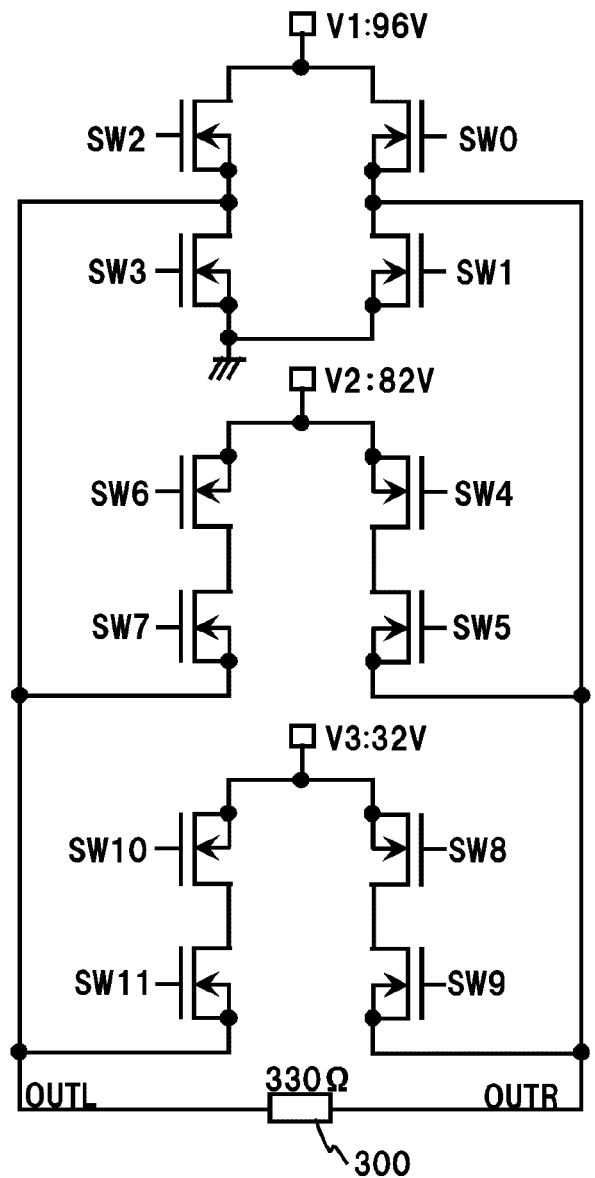
FIG. 5 depicts a mount circuit of an inverter according to an embodiment of the present invention.

FIG. 5 depicts a mount circuit of the inverter 200 according to the embodiment of the present invention. The power supply voltage E1 of the first DC power supply V1, the power supply voltage E2 of the second DC power supply V2, and the power supply voltage E3 of the third DC power supply V3 are set at 96 V, 82 V, and 32 V, respectively. The 1-1st switch S11, the 1-2nd switch S12, the first common switch S3, the second common switch S4, the 2-1st switch S21, the 2-2nd switch S22, the 3-1st switch S31, and the 3-2nd switch S32 in FIG. 1 correspond to a switch SW0, a switch SW2, a switch SW1, a switch SW3, switches SW4 and SW5, switches SW6 and SW7, switches SW8 and SW9, and switches SW10 and SW11 in FIG. 5, respectively.

FIG. 6 is a table expressing the on/off states of the switches for generating the 7 kinds of gradation voltages with the inverter 200 depicted in FIG. 5. Gradation levels 0, 1, 2, 3, 4, 5, and 6 correspond to zero voltage, the potential difference (E1−E2) (positive), the voltage E3 of the third DC power supply V3 (positive), the potential difference (E2−E3) (positive), the potential difference (E1−E3) (positive), the voltage E2 of the second DC power supply V2 (positive), and the voltage E1 of the first DC power supply V1 (positive), respectively. The control section 20 performs the on/off control on the switches SW0 to SW11 in accordance with FIG. 6 for generating the 7 kinds of gradation voltages.

Description is made below on how to generate a smooth quasi-sine wave with the harmonic wave component reduced by utilizing that the inverter 200 can generate the plural gradation voltages including the power supply voltages from the plural DC power supplies and the potential difference between the two power supply voltages.

Figure 7:
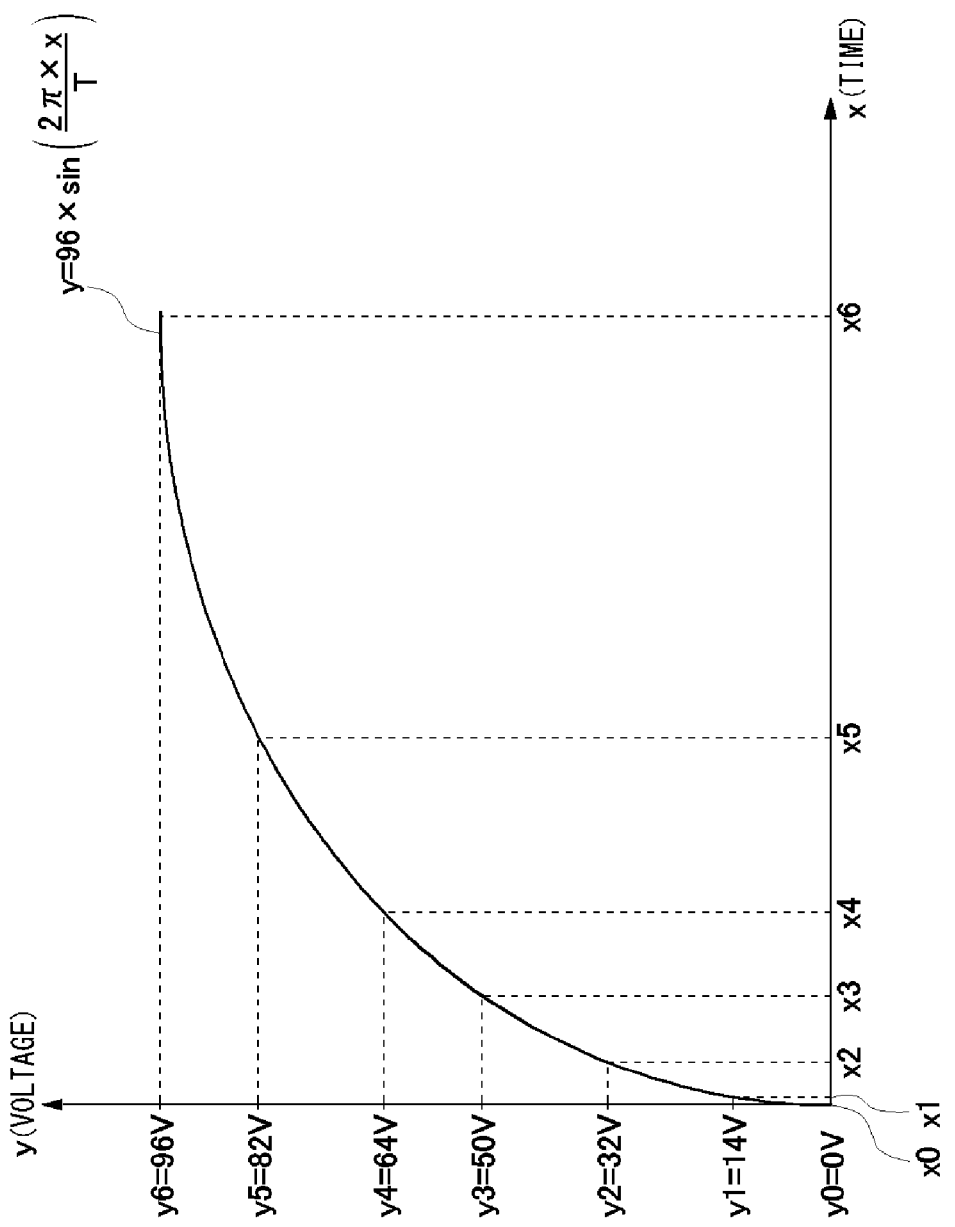
FIG. 7 is a graph expressing the relation between the gradation voltages and the quarter period of the ideal sine wave.

FIG. 7 is a graph expressing the relation between the gradation voltages and the quarter period of an ideal sine wave. The vertical axis y represents the voltage and the horizontal axis x represents time. When the amplitude of the sine wave is set as the maximum gradation voltage (96 V) and the period of the sine wave is represented by T, the sine wave is expressed as y=96×sin(2πx/T). When the gradation voltages are expressed with y0 to y6, they are y0=0 V, y1=14 V, y2=32 V, y3=50 V, y4=64 V, y5=82 V, and y6=96 V. The times of the gradation voltages are expressed as follows: x0=0, x1=arcsin (14/96)×T/2π, x2=arcsin(32/96)×T/2π, x3=arcsin(50/96)×T/2π, x4=arcsin(64/96)×T/2π, x5=arcsin(82/96)×T/2π, and x6=arcsin(96/96)×T/2π.

In this embodiment, the control section 20 generates the quasi-sine wave by, in the time range where a sine wave voltage is at two gradation voltages, generating a PWM (pulse width modulation) signal with one gradation voltage set at a low level and the other gradation voltage set at a high level. With reference to FIG. 7, the sine wave voltage is at gradation voltages of x0 to x6 in the quarter period of the AC output (sine wave output), and in any two time ranges, the control section 20 generates the PWM signal with one gradation voltage set at the low level and the other gradation voltage set at the high level. The control section 20 preferably generates the quasi-sine wave by generating the PWM signal within the time range including the adjacent gradation voltages. Specifically, the combination of the times including the adjacent gradation voltages is x0 and x1, x1 and x2, x2 and x3, x3 and x4, x4 and x5, and x5 and x6.

Figure 8:
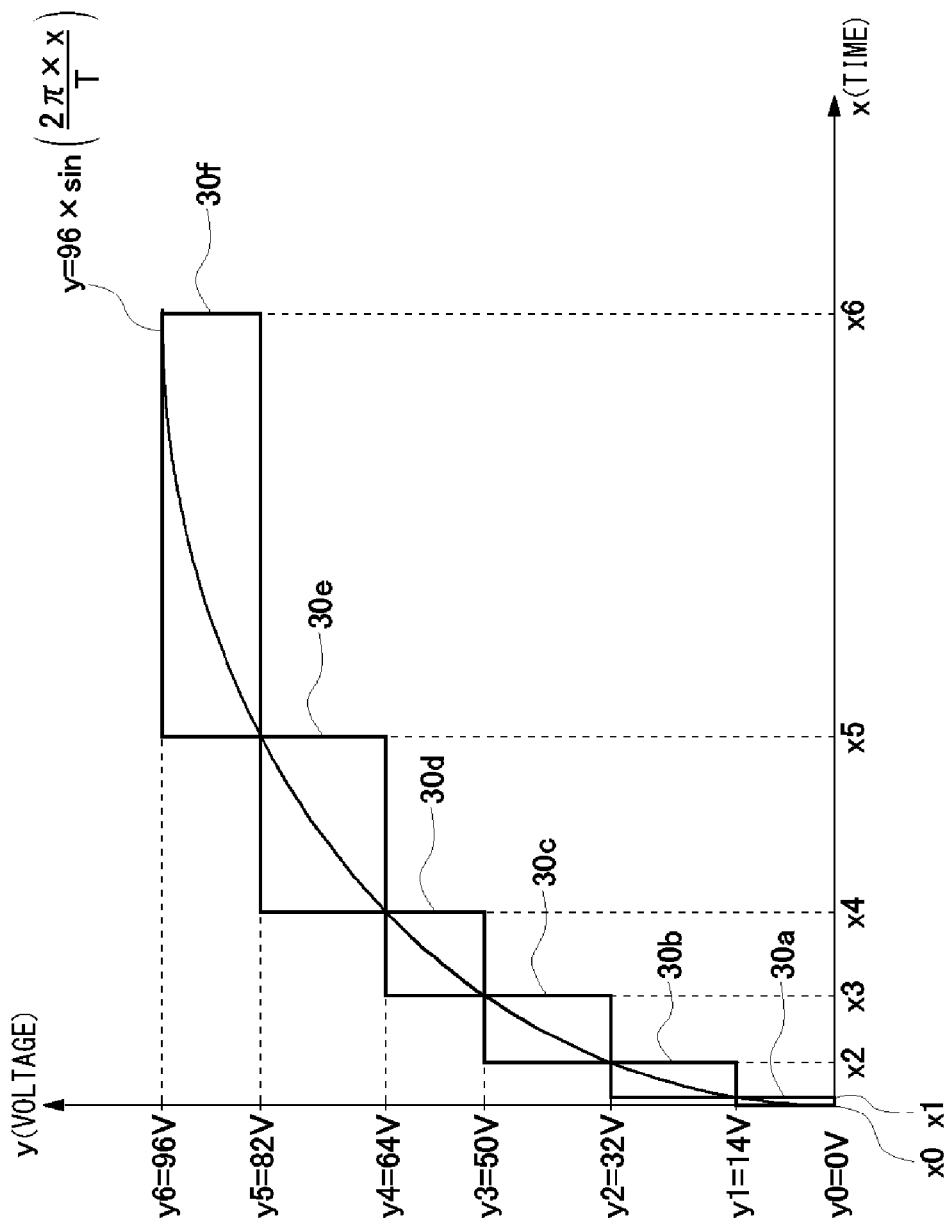
FIG. 8 is a diagram expressing windows.

FIG. 8 is a diagram expressing the PWM control of the control section 20. In FIG. 8, the adjacent gradation voltages and the time at which the sine wave voltage is at the gradation voltage are framed, and a framed region is called a window for the convenience of description. As depicted, in the quarter period of the sine wave including the seven gradation voltages (y0 to y6), six windows 30a to 30f are formed. The control section 20 generates the quasi-sine wave by generating the PWM signal in each window 30.

In each frame of the window 30, the bottom line expresses the low level of the PWM signal, the top line expresses the high level of the PWM signal, the left line expresses the start time of the PWM control and the right line expresses the completion time of the PWM control in the corresponding window 30. The timing for switching the level of the PWM signal is determined using an intersection between the sine wave and a triangular wave generated with one gradation voltage of the window 30 set at the low level and the other gradation voltage thereof set at the high level. The timing for switching the PWM signal may be determined dynamically or may be determined in advance and then stored in a table.

Figure 9:
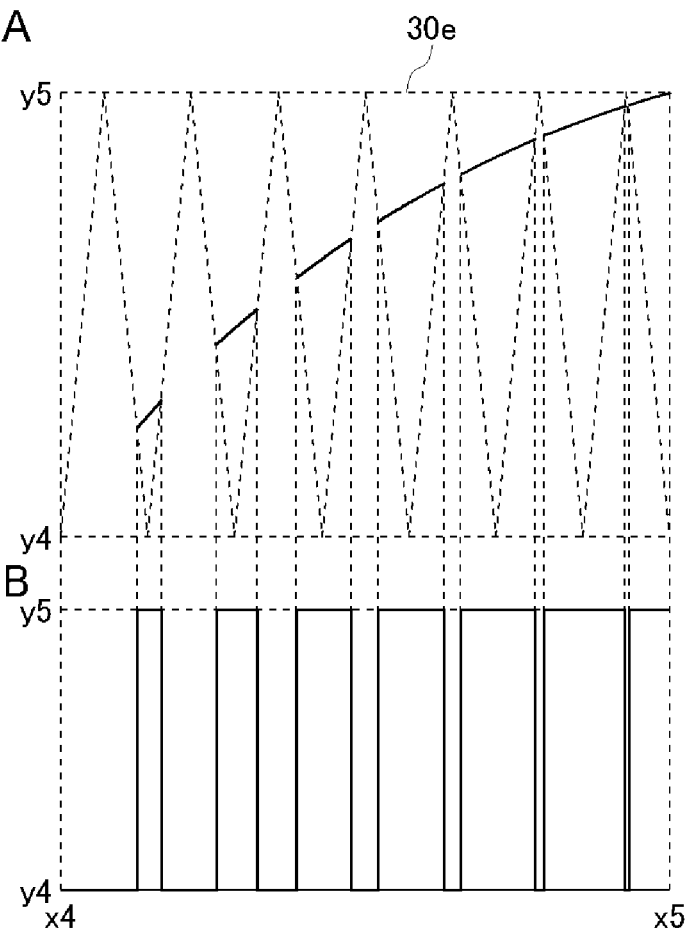
FIGS. 9A and B are diagrams expressing PWM control.

FIG. 9A depicts the state where the triangular wave is virtually generated in the window 30. In this embodiment, the time where the triangular wave and the sine wave intersect with each other is extracted and that time is determined as the timing for switching the voltage of the PWM signal. Although FIG. 9A depicts the state where the triangular wave is generated in the window 30e, the time where the triangular wave and the sine wave intersect with each other is extracted and set as the timing for switching the voltage of the PWM signal similarly in the other windows 30.

FIG. 9B depicts the low-level and high-level output voltages in the PWM control in the window 30e. These output voltages constitute the quasi-sine wave in the time range of the window 30e. With reference to FIG. 9A, the control section 20 generates the PWM voltage so that the low-level gradation voltage is output when the triangular wave voltage is higher than the sine wave voltage and the high-level gradation voltage is output when the sine wave voltage is higher than the triangular wave voltage. The control section 20 can make the average voltage in the time range of the window 30 equal to the average voltage of the sine wave by switching the voltage of the PWM control at the intersection between the sine wave and the triangular wave that is generated with one gradation voltage of the window 30 set at the low level and the other gradation voltage thereof set at the high level.

FIGS. 9A and 9B have described on the window 30e, and the timing for switching the voltage of the PWM control is determined similarly in the other windows 30. The combination between the gradation voltage control and the PWM control in this manner allows the output of the sine wave with the amplitude at the maximum gradation voltage and the output of the quasi-sine wave with total harmonic distortion reduced.

Although the triangular wave with one gradation voltage of the window 30 set at the low level and the other gradation voltage thereof set at the high level is generated in FIG. 9A, the triangular wave may alternatively be formed to have amplitude with the intermediate voltage between the two gradation voltages as a center. Even in the latter case, the timing for switching the level of the PWM signal is determined using the intersection between the generated triangular wave and sine wave as described with reference to FIG. 9B.

Figure 10:
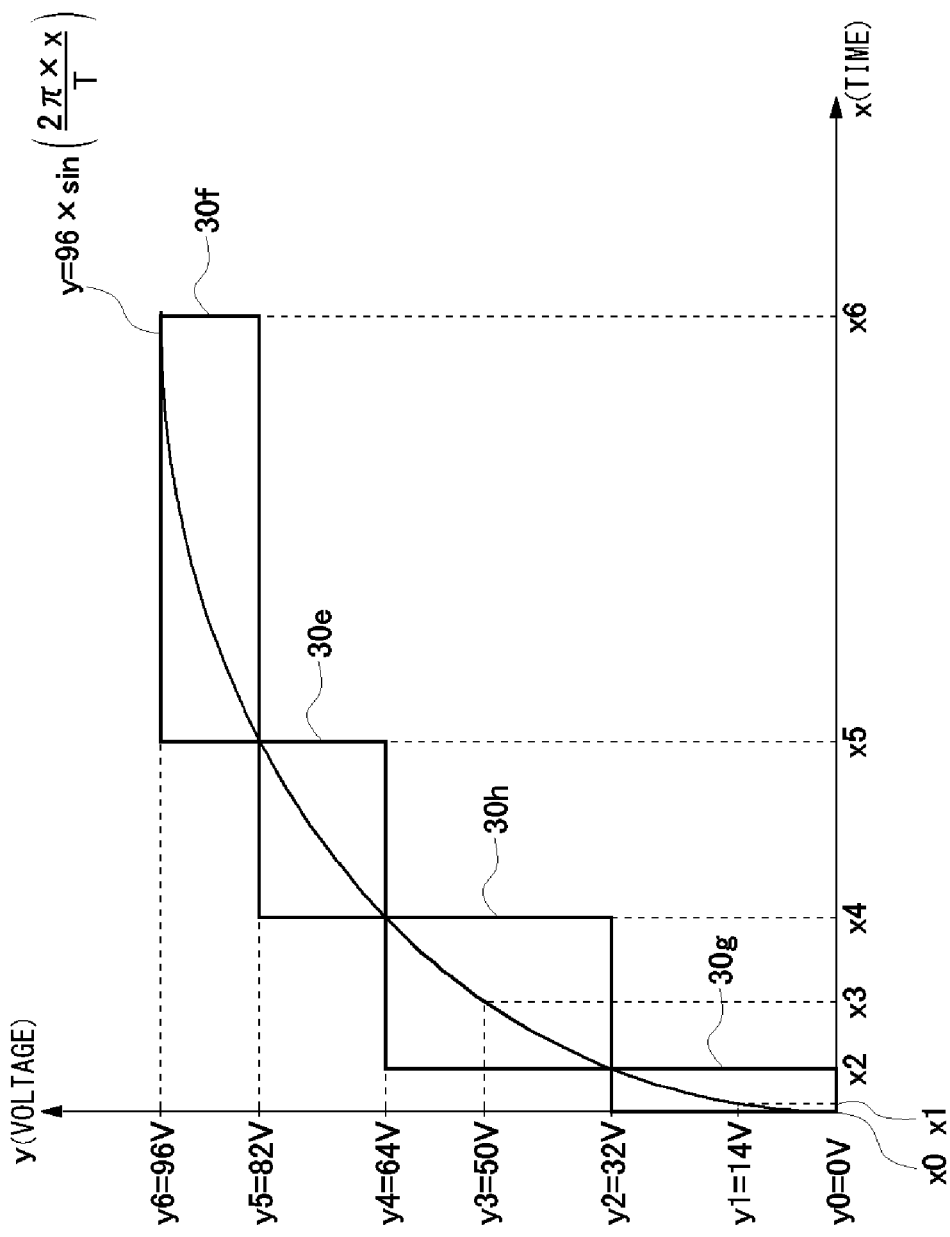
FIG. 10 is a diagram for describing a modified example of the windows.

FIG. 10 is a diagram expressing a modified example of the window. In comparison with FIG. 8, the windows 30a and 30b are collectively depicted as a window 30g, and the windows 30c and 30d are collectively depicted as a window 30h in FIG. 10. By extending the time width of the window 30 to some extent, the PWM control can be simplified to achieve stable PWM control with less switching loss. In either case of FIGS. 8 and 10, the harmonic wave component can be reduced drastically by performing the PWM control in the plural windows 30 in the quarter period of the AC output. The voltage switching pattern for each window 30 of the PWM control may be formed in advance and stored in a table; in this case, the control section 20 performs the on/off control of each switch SW with reference to the voltage pattern of the table. Note that FIGS. 8 and 10 indicate the 0 to quarter period of the AC output; in addition, the voltage switching pattern for each window is led also on the quarter to one period and stored in the table.

Figure 11:
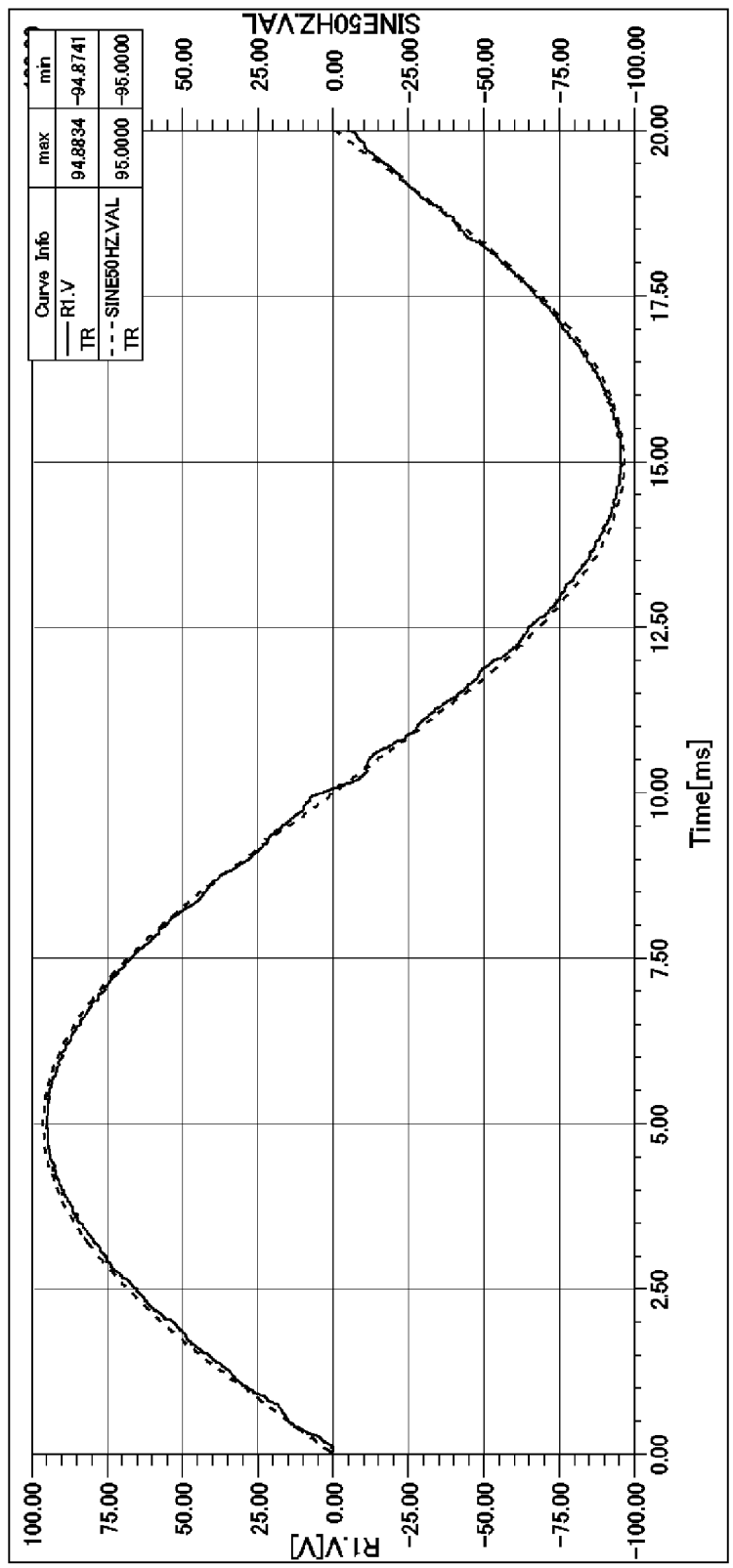
FIG. 11 is a graph made based on simulation results.

FIG. 11 is a graph made based on the results of simulation in which the gradation control and the PWM control are combined. In the graph, the dotted line represents the sine wave and the solid line represents the quasi-sine wave generated by the inverter 200. This simulation has provided the result in which 39-th total harmonic distortion occupied in the signal is 1.52% and the conversion efficiency is 98.1%, and it has been confirmed that the harmonic wave component in the quasi-sine wave is reduced.

Figure 12:
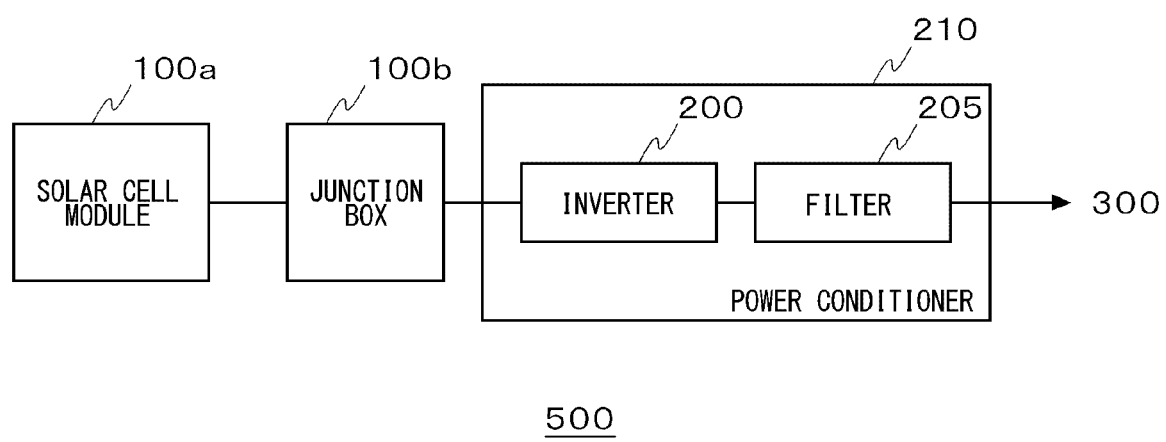
FIG. 12 is a system configuration diagram of a photovoltaic power generation system.

FIG. 12 is a system configuration diagram of a photovoltaic power generation system 500 including a power conditioner 210 having the inverter 200 according to the embodiment mounted. The photovoltaic power generation system 500 includes a solar cell module 100a, a junction box 100b, and the power conditioner 210. The power conditioner 210 serves as a power conversion device for converting DC power into AC power.

The solar cell module 100a includes a plurality of photovoltaic panels and installed on a roof of a building, for example. The solar cell module 100a converts sunlight into DC power and outputs the DC power to the junction box 100b.

The junction box 100b collects wires from the photovoltaic panels included in the solar cell module 100a. The junction box 100b supplies to the power conditioner 210, a plurality of DC voltages corresponding to the number of DC power supplies used in the inverter 200 according to the embodiment. In the case where the DC voltages can be directly acquired from the photovoltaic panels, the voltages can be directly supplied to the power conditioner 210. In the case where the DC voltages cannot be acquired directly from the photovoltaic panels, the DC voltages, which cannot be directly acquired, are generated using a boosting circuit.

The power conditioner 210 includes the inverter 200 according to the embodiment and a filter 205. The inverter 200 generates a quasi-sine wave using the DC voltages supplied from the junction box 100b. The filter 205 smoothens the quasi-sine wave generated by the inverter 200.

The AC power generated by the power conditioner 210 is supplied to the load 300. For example, in the photovoltaic power generation system 500 for home use, the power is supplied to electric appliances in the house or to a power distribution grid through a power distribution board.

As thus described, the photovoltaic power generation system 500 with high energy conversion efficiency can be constructed by the use of the inverter 200 according to the embodiment for the power conditioner 210 for the photovoltaic power generation system 500.

The present invention has been described so far based on the embodiment. This embodiment is just an example, and it is understood by those skilled in the art that the components and process can be modified variously and that the modified examples are also included in the scope of the present invention.

In this embodiment, the inverter 200 generates the quasi-sine wave with the plural gradation voltages including the power supply voltages from the plural DC power supplies and the potential difference between the two power supply voltages. In another embodiment, the inverter 200 may generate the quasi-sine wave with plural gradation voltages including only power supply voltages from a plurality of DC power supplies, or in the case where the sum voltage of two power supply voltages can be generated, may generate the quasi-sine wave with power supply voltages from a plurality of DC power supplies and the sum voltage of the two power supply voltages.

Alternatively, the inverter 200 may generate the quasi-sine wave with plural gradation voltages including power supply voltages, a difference voltage between the two power supply voltages, and a sum voltage of the two power supply voltages.

Although the description has been made on the example in which the inverter 200 according to the embodiment is employed for the power conditioner 210 for the photovoltaic power generation system 500, the present invention is not limited to this; the inverter 200 can alternatively be applied to another device such as an instant voltage drop protection device or an uninterruptible power supply device (Uninterruptible Power Supply: UPS).

What is claimed is:

1. An inverter for generating a quasi-sine wave and applying the quasi-sine wave to a load, comprising:
a first switch element;
a second switch element;
a third switch element;
a fourth switch element;
a first common switch element;
a second common switch element; and
a control section, wherein
the first switch element is provided in a path that connects a high-potential-side terminal of a first DC power supply and a high-potential-side terminal of the load,
the second switch element is provided in a path that connects the high-potential-side terminal of the first DC power supply and a low-potential-side terminal of the load,
the third switch element and the fourth switch element are provided in parallel between a high-potential-side of a second DC power supply and the load,
the first common switch element and the second common switch element are provided in parallel between a low-potential-side of the second DC power supply and the load,
the control section generates a first PWM signal with a differential voltage set at a low level and a voltage higher than the differential voltage set at a high level, by alternately generating a first output period and an output period different from the first output period in a period between a first start time and a first end time, the differential voltage being a voltage difference between a first voltage of the first DC power supply and a second voltage of the second DC power supply,
the control section generates a second PWM signal with the second voltage set at a high level and a voltage lower than the second voltage set at a low level, by alternately generating a second output period and an output period different from the second output period in a period between a second start time and a second end time,
the control section generates a third PWM signal with the second voltage set at a low level and the first voltage set at a high level, by alternately generating the second output period and a third output period in a period between a third start time and a third end time,
the quasi-sine wave is formed by the first PWM signal, the second PWM signal, and the third PWM signal,
the first output period is a period in which the differential voltage between the first voltage and the second voltage is applied to the load while the control section turns on the first switch element and the fourth switch element and turns off the second switch element, the third switch element, the first common switch element, and the second common switch element,
the second output period is a period in which the second voltage is applied to the load while the control section turns on the third switch element and the second common switch element and turns off the first switch element, the second switch element, the fourth switch element, and the first common switch element,
the third output period is a period in which the first voltage is applied to the load while the control section turns on the first switch element and the second common switch element and turns off the second switch element, the third switch element, the fourth switch element, and the first common switch element,
denoting the first voltage, the second voltage, and the differential voltage by E1, E2, and E12, the voltages satisfy a relationship E1>E2>E12,
denoting a period of the quasi-sine wave by T, the first start time by xas, the third start time by xcs, and the third end time by xce, the first start time, the third start time, and the third end time are given by:

$xas = \arcsin(E12/E1) \times T/2\pi$ $xcs = \arcsin(E2/E1) \times T/2\pi$ $xce = \arcsin(E1/E1) \times T/2\pi$ denoting the first end time by xae, the second start time by xbs, and the second end time by xbe, the first start time, the first end time, the second start time, and the second end time satisfy a relationship: xas<xae≤xbs<xbe, and the second end time xbe and the third start time xcs are the same.

2. The inverter according to claim 1, wherein the quasi-sine wave is generated based on an ideal sine wave, the ideal sine wave is a sine wave having an amplitude equal to the first voltage and given by an expression (1) below, $$y = E1 \times \sin\left(\frac{2\pi \times x}{T}\right) \quad (1)$$

where y denotes a voltage and x denotes time, the control section alternately generates the first output period and the output period different from the first output period by switching between the first output period and the output period different from the first output period concurrently with an intersection between the expression (1) and a first triangular wave in the period between the first start time and the first end time, the control section alternately generates the second output period and the output period different from the second output period by switching between the second output period and the output period different from the second output period concurrently with an intersection between the expression (1) and a second triangular wave in the period between the second start time and the second end time, and the control section alternately generates the second output period and the third output period by switching between the second output period and the third output period concurrently with an intersection between the expression (1) and a third triangular wave in the period between the third start time and the third end time.

* * * * *